United States Patent
Moon

(10) Patent No.: US 12,359,092 B2
(45) Date of Patent: Jul. 15, 2025

(54) NON-SUBSTRATE ADHESIVE TAPE WITH DIFFERENT ADHESIVE PROPERTIES ON BOTH SIDES AND MANUFACTURING METHOD THEREOF

(71) Applicants: Truss Co., Ltd, Incheon (KR); MOON HO SEUP, Incheon (KR)

(72) Inventor: Ho Seup Moon, Incheon (KR)

(73) Assignees: Truss Co., Ltd, Incheon (KR); Ho Seup Moon, Incheon (KR)

( * ) Notice: Subject to any disclaimer, the term of this patent is extended or adjusted under 35 U.S.C. 154(b) by 91 days.

(21) Appl. No.: 17/674,460

(22) Filed: Feb. 17, 2022

(65) Prior Publication Data
US 2022/0267647 A1    Aug. 25, 2022

(30) Foreign Application Priority Data

Feb. 19, 2021    (KR) ........................ 10-2021-0022236

(51) Int. Cl.
| | |
|---|---|
| *C09J 7/10* | (2018.01) |
| *C09J 7/38* | (2018.01) |
| *B32B 37/12* | (2006.01) |

(52) U.S. Cl.
CPC ................ *C09J 7/10* (2018.01); *C09J 7/385* (2018.01); *B32B 37/12* (2013.01); *B32B 2037/1253* (2013.01); *C09J 2301/1242* (2020.08); *C09J 2433/00* (2013.01); *C09J 2483/00* (2013.01); *C09J 2483/003* (2013.01)

(58) Field of Classification Search
None
See application file for complete search history.

(56) References Cited

U.S. PATENT DOCUMENTS

| | | | |
|---|---|---|---|
| 2013/0052460 A1* | 2/2013 | Iseki ...................... | B32B 27/20 |
| | | | 524/410 |
| 2019/0284445 A1* | 9/2019 | Furuta .................. | G11B 21/106 |
| 2021/0238453 A1* | 8/2021 | Yamaguchi ............ | C08G 77/00 |

FOREIGN PATENT DOCUMENTS

| | | | | | |
|---|---|---|---|---|---|
| JP | 2019123853 | A | * | 7/2019 | |
| JP | 2020-41058 | A | | 3/2020 | |
| KR | 10-0924320 | B1 | | 11/2009 | |
| KR | 10-2017-0069819 | A | | 6/2017 | |
| KR | 10-2018-0079695 | A | | 7/2018 | |
| KR | 20180079695 | A | * | 7/2018 | |
| KR | 20190037861 | A | * | 4/2019 | ............ C09J 133/00 |
| WO | WO-2019208141 | A1 | * | 10/2019 | ........... C08G 65/007 |

OTHER PUBLICATIONS

Definition: adherend, Sep. 2024, https://www.merriam-webster.com/dictionary/adherend#:~:text=%CB%8Cad%2D%CB%8Chir%2D%CB%88end,to%20another%20by%20an%20adhesive.*

* cited by examiner

*Primary Examiner* — Eli D. Strah
(74) *Attorney, Agent, or Firm* — Sughrue Mion, PLLC

(57) ABSTRACT

A non-substrate adhesive tape with different adhesive properties on both sides and a manufacturing method of the non-substrate adhesive tape are disclosed. The adhesive tape includes heterogeneous first and second adhesive layers that have different properties from each other and are laminated by using a non-substrate primer coating layer. The adhesive tape includes a primer coating layer interposed between a first adhesive layer and a second adhesive layer, and the first adhesive layer is a silicone adhesive layer.

16 Claims, 1 Drawing Sheet

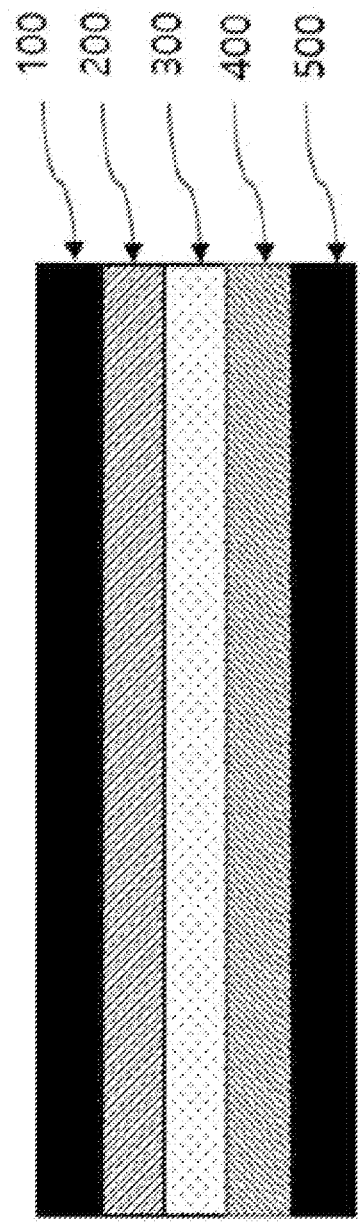

NON-SUBSTRATE ADHESIVE TAPE WITH DIFFERENT ADHESIVE PROPERTIES ON BOTH SIDES AND MANUFACTURING METHOD THEREOF

CROSS-REFERENCE TO RELATED APPLICATION

This application claims the priority from Korean Patent Application No. 10-2021-0022236, filed on Feb. 19, 2021, in the Korean Intellectual Property Office, the disclosure of which is incorporated herein in its entirety by reference.

BACKGROUND

1. Field

The present invention relates to a non-substrate adhesive tape with different adhesive properties on both sides and a manufacturing method thereof, wherein the adhesive tape includes heterogeneous first and second adhesive layers that have different properties and are laminated by using a non-substrate primer coating layer.

2. Description of Related Art

Various members are bonded to electronic devices by adhesives. For example, various optical members such as a polarizing plate, a retardation plate, an optical compensation film, a reflective sheet, a protective film, and a brightness enhancement film may be bonded to a liquid crystal display (LCD) by an adhesive. Recently, as a thickness of an electronic device has reduced, an attempt to realize excellent durability while reducing a thickness of an adhesive layer for bonding members in an electronic device has continued.

Accordingly, an adhesive tape in a non-substrate form is being studied. However, when the substrate is not used, problems may occur in high-temperature shearing properties of the adhesive layer. In addition, electronic devices are manufactured by using a continuous process, and a separate punching process is required to apply a non-substrate adhesive tape to the continuous process.

On the other hand, in the case of general non-substrate adhesive tapes, only those made of a single type of adhesive layer have been developed, and it is common that even a product having a multi-layer structure does not deviate from the same or similar series of materials. In addition, when an adhesive tape is manufactured by using two kinds of adhesive layers with different adhesive properties, such as a silicone adhesive and an acrylic adhesive, it is essential to insert a separate substrate layer such as PET between the two adhesive layers in order to prevent layer separation. However, when a separate substrate layer is inserted as described above, the substrate layer is included in the middle, and thus, an adhesive tape including the substrate layer is hard, has poor adhesion to a bonding surface, and particularly has great repulsion resistance to a bent portion. Therefore, there have been limitations in the field of application.

Accordingly, the inventors of the present application have studied to solve the above problems and found that, when an adhesive tape was manufactured by interposing a primer coating layer between heterogeneous first and second adhesive layers with different properties, it was possible to manufacture a non-substrate adhesive tape in which layer separation did not occur and which has different adhesive properties on both sides, is soft, and has excellent repulsion resistance to a bent portion. Therefore, the inventors of the present application have completed the present invention.

In this regard, Korean Patent Registration No. 10-0924320 discloses a nonflammable adhesive tape for a fire door.

SUMMARY

The present invention has been made in an effort to solve the problems of the related art, and an object of the present invention is to provide a non-substrate adhesive tape with different adhesive properties on both sides.

Another object of the present invention is to provide a method of manufacturing a non-substrate adhesive tape with different adhesive properties on both sides.

According to an aspect of the present invention, a non-substrate adhesive tape with different adhesive properties on both sides includes: a first adhesive layer; a second adhesive layer; and a primer coating layer interposed between the first adhesive layer and the second adhesive layer, wherein the first adhesive layer is a silicone adhesive layer.

The silicone adhesive layer may include a material selected from the group consisting of a silicone gum, a silicone resin, and any combination thereof.

The silicone gum may include a material selected from the group consisting of organopolysiloxane having at least one functional group selected from a phenyl group, an amino group, a hydroxy group, a mercapto group, and a carboxyl group, polysiloxane having a vinyl group, methyl polysiloxane having a vinyl group, polydimethylsiloxane having a vinyl group, and any combination thereof.

The silicone resin may be organopolysiloxane having at least one unit selected from the group consisting of $R_3SiO_{1/2}$ (M unit), $SiO_2$ (Q unit), $RSiO_{3/2}$ (T unit), $R_2SiO$ (D unit), and any combination thereof.

The silicone adhesive layer may further include a material selected from the group consisting of a tackifier, an anchorage, and any combination thereof.

A thickness of the silicone adhesive layer may be 1 μm to 1,000 μm.

An adhesive strength of the silicone adhesive layer may be 1 gf/in to 2,000 gf/in.

The second adhesive layer may include an adhesive selected from the group consisting of an acrylic adhesive, a urethane-based adhesive, a rubber-based adhesive, an epoxy-based adhesive, and any combination thereof.

The acrylic adhesive may be an acrylic copolymer containing methacrylic acid alkylester having 2 to 18 carbon atoms.

A thickness of the second adhesive layer may be 1 μm to 1,000 μm.

An adhesive strength of the second adhesive layer may be 10 gf/in to 5,000 gf/in.

The primer coating layer may be formed by performing physical surface treatment or chemical bonding on the silicone adhesive layer.

The physical surface treatment may be performed by using corona or carbon dioxide ($CO_2$) plasma treatment on the silicon adhesive layer.

The chemical bonding may be performed by coating a material selected from the group consisting of an acrylic resin having a carboxyl group and a hydroxyl group, a urethane-based resin, an epoxy-based resin, a silicone-based resin, a rubber-based resin, a silicone modified resin, and any combination thereof on the silicone adhesive layer.

A thickness of the primer coating layer may be 0.1 μm to 50 μm.

In addition, according to another aspect of the present invention, a method of manufacturing a non-substrate adhesive tape with different adhesive properties on both sides include: applying and curing a first adhesive layer onto a first release film; applying and curing a primer coating layer onto the first adhesive layer; applying and curing a second adhesive layer onto a second release film; and laminating the primer coating layer and the second adhesive layer, wherein the first adhesive layer is a silicone adhesive layer.

BRIEF DESCRIPTION OF THE DRAWING

FIGURE is a schematic diagram showing a state of use of a non-substrate adhesive tape according to an embodiment of the present invention.

DETAILED DESCRIPTION

Hereinafter, the present invention will be described in more detail. However, the present invention may be embodied in various different forms and is not limited by embodiments described herein, and the present invention is only defined by the claims to be described below.

In addition, the terms as used herein are only used to describe specific embodiments, and are not intended to limit the present invention. The singular forms as used herein are intended to include the plural forms as well unless the context clearly indicates otherwise. In the specification of the present invention, the phrase "including a certain element" means "further including other elements" rather than excluding other elements unless otherwise stated.

According to a first aspect of the present invention, a non-substrate adhesive tape with different adhesive properties on both sides includes a first adhesive layer, a second adhesive layer, and a primer coating layer interposed between the first adhesive layer and the second adhesive layer, wherein the first adhesive layer is a silicone adhesive layer.

Hereinafter, the non-substrate adhesive tape according to the first aspect of the present invention will be described in detail with reference to FIGURE. FIGURE is a schematic diagram showing a state of use of a non-substrate adhesive tape according to an embodiment of the present invention.

In an embodiment of the present invention, the non-substrate adhesive tape with different adhesive properties on both sides may include a first adhesive layer 200, and the first adhesive layer 200 may be a silicone adhesive layer.

In an embodiment of the present invention, the silicone adhesive layer may have excellent adhesion to a material such as a non-polar olefin-based or silicone pad having very low surface energy, and may include a material selected from the group consisting of a silicone gum, a silicone resin, and any combination thereof. In addition, a silicone adhesive constituting the silicone adhesive layer may use both of a condensation reaction type in which radicals are generated in a silicone resin and thus a curing reaction occurs due to radical generation of peroxide, and an addition reaction type including a platinum catalyst, a curing agent and a silicone resin component, and the types of curing agent used in each silicone adhesive may be different from each other. This will be described below in more detail in a second aspect of the present invention.

In an embodiment of the present invention, the silicone gum may include a material selected from the group consisting of organopolysiloxane having at least one functional group selected from a phenyl group, an amino group, a hydroxy group, a mercapto group, and a carboxyl group, polysiloxane having a vinyl group, methyl polysiloxane having a vinyl group, polydimethylsiloxane having a vinyl group, and any combination thereof. The silicone gum may be a factor that greatly affects adhesive strength and cohesive strength, and the molecular weight of the silicone gum may be 100,000 g/mol to 2,000,000 g/mol. When the molecular weight of the silicone gum is low, reliability (adhesive strength) may be reduced under high temperature and humidity conditions, and when the molecular weight of the silicone gum is high, a problem may occur in workability for manufacturing the non-substrate adhesive tape.

In an embodiment of the present invention, the silicone resin may be organopolysiloxane having at least one unit selected from the group consisting of $R_3SiO_{1/2}$ (M unit), $SiO_2$ (Q unit), $RSiO_{3/2}$ (T unit), $R_2SiO$ (D unit), and any combination thereof. Preferably, the silicone resin may be an MQ resin including $R_3SiO_{1/2}$ (M unit) and $SiO_2$ (Q unit). On the other hand, a copolymer in which a functional group is introduced as necessary may be used for the silicone resin. In this case, the functional group may cause a crosslinking reaction.

In an embodiment of the present invention, the silicone adhesive layer may further include a material selected from the group consisting of a tackifier, an anchorage, and any combination thereof.

In an embodiment of the present invention, the tackifier may include a tackifier selected from the group consisting of a rosin ester tackifier, a terpene-based tackifier, a petroleum resin tackifier, a coal-based tackifier, an alkyl phenolic tackifier, and any combination thereof. In this case, the amount of the tackifier may be 1 to 20 parts by weight, and preferably 5 to 15 parts by weight, based on 100 parts by weight of the silicone gum or the silicone resin. When the amount of the tackifier is less than 1 part by weight based on 100 parts by weight of the silicone gum or the silicone resin, the effect of modifying the properties of the silicone adhesive layer may be insignificant. When the amount of the tackifier is greater than 20 parts by weight, the bonding surface becomes hard and fluidity is reduced, which may lower the adhesive strength of the silicone adhesive layer.

In an embodiment of the present invention, the anchorage may be included to improve adhesion between the silicone adhesive layer and the primer coating layer, and may include a material selected from the group consisting of tetra(trimethylsiloxy)silane, (3-glycidoxypropyl)trimethoxysilane, and any combination thereof. On the other hand, the amount of the anchorage may be 0.5 to 2 parts by weight based on 100 parts by weight of the silicone gum or the silicone resin. When the amount of the anchorage is less than 0.5 parts by weight based on 100 parts by weight of the silicone gum or the silicone resin, the adhesion between the silicone adhesive layer and the primer coating layer is not improved, and thus, layer separation may occur. When the amount of the anchorage is greater than 2 parts by weight, it may be cost-inefficient because it already exceeds an amount sufficient to improve inter-layer adhesion.

In an embodiment of the present invention, the thickness of the silicone adhesive layer may be 1 μm to 1,000 μm, and preferably about 10 μm to about 500 μm. In addition, the adhesive strength of the silicone adhesive layer may be 1 gf/in to 2,000 gf/in, and preferably about 5 gf/in to about 2,000 gf/in.

In an embodiment of the present invention, the non-substrate adhesive tape with different adhesive properties on both sides may include a second adhesive layer 400. The second adhesive layer 400 may include a polar or non-polar adhesive layer.

In an embodiment of the present invention, the second adhesive layer may have excellent adhesion to a material having high surface energy, such as metal or plastic, and may include an adhesive selected from the group consisting of an acrylic adhesive, a urethane-based adhesive, a rubber-based adhesive, an epoxy-based adhesive, and any combination thereof preferably, the second adhesive layer may include an acrylic adhesive.

In an embodiment of the present invention, the acrylic adhesive may be an acrylic copolymer containing methacrylic acid alkylester having 2 to 18 carbon atoms. In addition, the acrylic copolymer may have a glass transition temperature (Tg) of −60° C. to −10° C. and a weight average molecular weight of 500,000 to 1.5 million. When the glass transition temperature (Tg) and the weight average molecular weight of the acrylic copolymer are less than the above ranges, the cohesive strength and heat resistance of the second adhesive layer including the acrylic copolymer may decrease. When the glass transition temperature (Tg) and the weight average molecular weight of the acrylic copolymer are greater than the above ranges, the cohesive strength may excessively increase, and thus, a tack and adhesive strength may decrease. On the other hand, the acrylic copolymer may have one or more functional groups selected from a carboxyl group and a hydroxyl group.

In an embodiment of the present invention, the thickness of the second adhesive layer may be 1 μm to 1,000 μm, and preferably about 10 μm to about 500 μm. In addition, the adhesive strength of the second adhesive layer may be 10 gf/in to 5,000 gf/in, and may be appropriately adjustable depending on the application purpose. In this case, when the thickness and adhesive strength of the second adhesive layer are less than the above ranges, wettability and adhesive strength to the adherend may decrease. When the thickness and adhesive strength of the second adhesive layer are greater than the above ranges, the adhesive strength may excessively increase, and thus, the re-delamination to the adherend decrease.

In an embodiment of the present invention, the non-substrate adhesive tape with different adhesive properties on both sides may include a primer coating layer 300 interposed between the first adhesive layer 200 including the silicone adhesive layer and the second adhesive layer 400. That is, the non-polar silicone adhesive layer 200 having low surface energy and the second adhesive layer 400 have difficulty in exhibiting sufficient adhesive strength due to the difference in surface wettability. However, the primer coating layer is formed by performing physical surface treatment or chemical bonding on the surface of the silicone adhesive layer 200, thereby improving the adhesion thereof.

In an embodiment of the present invention, the physical surface treatment may be performed by using corona or carbon dioxide ($CO_2$) plasma treatment on the silicone adhesive layer. In addition, the chemical bonding may be performed by coating a material selected from the group consisting of an acrylic resin having a carboxyl group and a hydroxyl group, a urethane-based resin, an epoxy-based resin, a silicone-based resin, a rubber-based resin, a silicone modified resin, and any combination thereof on the silicone adhesive layer. The chemical bonding will be described in more detail. The chemical bonding gives hydrophobicity by treating silica and organosilane or organosiloxane, and utilizes the reactivity with an epoxy group of organopolysiloxane including an epoxy group and a hydroxyl group or an alkoxy group in a siloxane bond, which is one of the components of the silicone adhesive composition. The epoxy group may have excellent reactivity with a carboxyl group and a hydroxyl group. Therefore, the primer coating layer may be formed by coating a material selected from the group consisting of an acrylic resin having a carboxyl group and a hydroxyl group, a urethane-based resin, an epoxy-based resin, a silicone-based resin, a rubber-based resin, a silane-based resin, a silicone modified resin, and any combination thereof on the silicone adhesive layer.

In an embodiment of the present invention, the thickness of the primer coating layer may be 0.1 μm to 50 μm, and preferably about 0.5 μm to about 30 μm.

In an embodiment of the present invention, the thickness of the non-substrate adhesive tape may be 2 μm to 2,000 μm, and preferably about 20 μm to about 1,000 μm.

In an embodiment of the present invention, since the non-substrate adhesive tape with different adhesive properties on both sides is manufactured without a substrate, that is, in a non-substrate state, the non-substrate adhesive tape may have very excellent characteristics with respect to bending and shape deformation because the non-substrate adhesive tape is soft and has excellent adhesion to the bonding surface and repulsion resistance to the bent portion. Therefore, the non-substrate adhesive tape may be usable in various fields such as an optically clear adhesive (OCA) film in mobile devices.

In addition, since the primer coating layer 300 is interposed between the first adhesive layer 200 including the silicone adhesive layer and the second adhesive layer 400, layer separation does not occur between the silicone adhesive layer 200 and the second adhesive layer 400, which may be very stable. In addition, since it is possible to implement the adhesive tape with different adhesive properties on both sides, various materials from materials with low surface energy to materials with high surface energy may be widely applied, and various adhesive strengths from low to strong may be realized.

According to a second aspect of the present invention, a method of manufacturing a non-substrate adhesive tape includes: applying and curing a first adhesive layer onto a first release film; applying and curing a primer coating layer onto the first adhesive layer; applying and curing a second adhesive layer onto a second release film; and laminating the primer coating layer and the second adhesive layer, wherein the first adhesive layer is a silicone adhesive layer.

Although detailed descriptions of parts overlapping the first aspect of the present invention are omitted, the descriptions of the first aspect of the present invention may be equally applied even when the descriptions thereof are omitted in the second aspect.

Hereinafter, the method of manufacturing the non-substrate adhesive tape according to the second aspect of the present invention will be described in detail step by step with reference to FIG. 1. FIG. 1 is a schematic diagram showing a state of use of a non-substrate adhesive tape according to an embodiment of the present invention.

First, in an embodiment of the present invention, the method of manufacturing the non-substrate adhesive tape may include applying and curing a first adhesive layer 200 including a silicone adhesive layer onto a first release film 100.

In an embodiment of the present invention, a silicone adhesive constituting the silicone adhesive layer may use both of a condensation reaction type in which radicals are generated in a silicone resin and thus a curing reaction occurs due to radical generation of peroxide, and an addition reaction type including a platinum catalyst, a curing agent and a silicone resin component, and the types of curing agent used in each silicone adhesive may be different from each other.

In an embodiment of the present invention, a curing agent used in the condensation reaction type may include a material selected from the group consisting of benzoyl peroxide, t-butylperoxybenzoate, dicumylperoxide, t-butylcumylperoxide, di-t-butylperoxide, 2,5-dimethyl-2,5-di(t-butylperoxy)hexane, 2,4-dichlorobenzoyl peroxide, 1,1-bis(t-butylperoxy)-3,3,5-trimethylcyclohexane, 2,5-dimethyl-2,5-di(t-butylperoxy)hexyne-3, and any combination thereof. In this case, the amount of the curing agent may be 0.3 to 5 parts by weight, and preferably about 0.5 to 3 parts by weight, based on 100 parts by weight of the silicone gum or the silicone resin, which is the main component of the silicone adhesive.

In an embodiment of the present invention, in the case of the addition reaction type, a platinum-based, palladium-based, rhodium-based, ruthenium-based, or iridium-based catalyst may be used as a catalyst for promoting a hydrosilylation reaction. Preferably, a platinum-based catalyst may be used. In this case, as the platinum-based catalyst, chloroplatinic acid, alcohol solution or aldehyde solution of chloroplatinic acid, reactant of chloroplatinic acid and alcohol, various olefins of chloroplatinic acid or platinum, or complex of vinylsiloxane may be used. On the other hand, the catalyst may be used in an appropriate amount. When the amount of the catalyst is small, curing performance is lowered, crosslinking density is reduced, and adhesive strength or adhesion is deteriorated. When the amount of the catalyst is large, curing proceeds too quickly, and the stability of the adhesive composition is deteriorated. This may cause problems in the process and unreacted catalyst may remain, resulting in change over time in the adhesive tape.

In an embodiment of the present invention, a curing agent used in the addition reaction type may be a polysiloxane compound having at least one of functional groups such as Si—OH, Si—OR, or Si—H having reactivity with a vinyl siloxane group. Preferably, polydimethylsiloxane having a Si—H group having excellent adhesion without generating an adduct during the reaction may be used. In this case, the amount of the curing agent may be 0.3 to 3 parts by weight based on 100 parts by weight of the silicone gum or the silicone resin, which is the main component of the silicone adhesive. When the amount of the curing agent is less than 0.3 parts by weight, the degree of crosslinking is reduced to cause resin flow, and the silicone component migrates to the adherend. When the amount of the curing agent is greater than 3 parts by weight, adhesive strength and durability may be rather deteriorated due to some unreacted curing agents along with excessive curing.

In an embodiment of the present invention, the first release film 100 may be formed so as to protect the non-substrate adhesive tape from external contaminants. In actual use, the first release film 100 is removed and then the non-substrate adhesive tape adheres to the adherend. Preferably, the first release film 100 may be fluorine-treated for effective adhesion with the silicone adhesive layer 200.

In an embodiment of the present invention, the curing may be performed at a temperature of 100° C. to 200° C. According to an embodiment of the present invention, the curing may be performed at a temperature of about 170° C.

Next, in an embodiment of the present invention, the method of manufacturing the non-substrate adhesive tape may include applying and curing a primer coating layer 300 onto the first adhesive layer 200 including the silicone adhesive layer.

In an embodiment of the present invention, the primer coating layer 300 may be formed by performing physical surface treatment or chemical bonding on the surface of the silicone adhesive layer 200.

In an embodiment of the present invention, the physical surface treatment may be performed by using corona or carbon dioxide ($CO_2$) plasma treatment on the silicone adhesive layer. In addition, the chemical bonding may be performed by coating a material selected from the group consisting of an acrylic resin having a carboxyl group and a hydroxyl group, a urethane-based resin, an epoxy-based resin, a silicone-based resin, a rubber-based resin, a silicone modified resin, and any combination thereof on the silicone adhesive layer. The chemical bonding will be described in more detail. The chemical bonding gives hydrophobicity by treating silica and organosilane or organosiloxane, and utilizes the reactivity with an epoxy group of organopolysiloxane including an epoxy group and a hydroxyl group or an alkoxy group in a siloxane bond, which is one of the components of the silicone adhesive composition. The epoxy group may have excellent reactivity with a carboxyl group and a hydroxyl group. Therefore, the primer coating layer may be formed by coating a material selected from the group consisting of an acrylic resin having a carboxyl group and a hydroxyl group, a urethane-based resin, an epoxy-based resin, a silicone-based resin, a rubber-based resin, a silicone modified resin, and any combination thereof on the silicone adhesive layer.

In an embodiment of the present invention, the thickness of the primer coating layer may be 0.1 μm to 50 μm, and preferably about 0.5 μm to about 30 μm. In addition, the curing may be performed at a temperature of 80° C. to 200° C. According to an embodiment of the present invention, the curing may be performed at a temperature of about 110° C.

Next, in an embodiment of the present invention, the method of manufacturing the non-substrate adhesive tape may include: applying and curing a second adhesive layer onto a second release film; and laminating the primer coating layer and the second adhesive layer.

In an embodiment of the present invention, the second adhesive layer may have excellent adhesion to a material having high surface energy, such as metal or plastic, and may include an adhesive selected from the group consisting of an acrylic adhesive, a urethane-based adhesive, a rubber-based adhesive, an epoxy-based adhesive, and any combination thereof preferably, the second adhesive layer may include an acrylic adhesive.

In an embodiment of the present invention, the second adhesive layer may include a curing agent. In this case, the curing agent may include a material selected from the group consisting of 2,4-toluene diisocyanate, 2,6-toluene diisocyanate, 1,5-naphthalene diisocyanate, diphenylmethane diisocyanate, hexamethylene diisocyanate, isophorone diisocyanate, P-xylylene diisocyanate, M-xylylene diisocyanate, dicyclohexylmethane diisocyanate, aliphatic polyisocyanate, and any combination thereof. In addition, the curing agent is not limited to the isocyanate-based material, and any material may be used as long as the material is capable of crosslinking by bonding with a functional group included in a resin and a copolymer such as melamine, metal chelate, epoxy, and aziridine.

In an embodiment of the present invention, the curing may be performed at a temperature of 80° C. to 200° C. According to an embodiment of the present invention, the curing may be performed at a temperature of about 110° C.

In an embodiment of the present invention, like the first release film 100, the second release film 500 may be formed so as to protect the non-substrate adhesive tape from external contaminants. In actual use, the second release film 500 is removed and then the non-substrate adhesive tape adheres to the adherend. Preferably, the second release film 500 may be silicone-treated for effective adhesion with the second adhesive layer 400.

Hereinafter, examples of the present invention will be described so that those of ordinary skill in the art may easily carry out the present invention. However, the present invention may be implemented in various different forms and is not limited to the examples described herein.

Example 1. Manufacture of Non-Substrate Adhesive Tape with Different Adhesive Properties on Both Sides First, in order to prepare a silicone adhesive composition for forming a silicone adhesive layer, a polydimethyl/methylvinyl siloxane-based silicone adhesive resin and an MQ resin were used as a silicone resin, a polydimethylsiloxane having a Si—H group was used as a curing agent, and based on 100 parts by weight of the silicone adhesive, 1 part by weight of tetra(trimethylsiloxy)silane, 0.5 parts by weight of a platinum-based catalyst, 5 parts by weight of a tackifier, and 1 part by weight of a curing agent were used as anchorage. The prepared silicone adhesive composition was applied onto a fluorine-treated release film to a thickness of 50 μm, and was cured at a temperature of 170° C. to form a silicone adhesive layer.

Then, as a primer coating composition, a material in which 100 parts by weight of toluene was diluted with 100 parts by weight of a silicone modified resin (siloxanes and silicones, di-Me, hydroxy-terminated, reaction products with chlorotrimethylsilane, hydrochloric acid, iso-Pr alc. and sodium silicate (CAS NO. 68440-70-0)) was applied onto the silicone adhesive layer, and was cured at a temperature of 110° C. to form a primer coating layer.

Then, acrylic copolymer (glass transition temperature (Tg): −30° C./weight average molecular weight: 1 million) containing $C_2$-$C_{18}$ methacrylic acid alkylester and 2,4-toluene diisocyanate as a curing agent were mixed in an amount of 0.75 parts by weight based on 100 parts by weight of the acrylic copolymer, were applied onto a silicone-treated release film to a thickness of 50 μm, and were cured at a temperature of 110° C. to form an acrylic adhesive layer.

Thereafter, the acrylic adhesive layer was laminated on the primer coating layer to manufacture a non-substrate adhesive tape. The thickness of the finally manufactured non-substrate adhesive tape was 100 μm.

Example 2. Manufacture of Non-Substrate Adhesive Tape with Different Adhesive Properties on Both Sides A non-substrate adhesive tape was manufactured in the same manner as in Example 1, except that an amount of a tackifier included in a silicone adhesive composition was 10 parts by weight.

Example 3. Manufacture of Non-Substrate Adhesive Tape with Different Adhesive Properties on Both Sides A non-substrate adhesive tape was manufactured in the same manner as in Example 1, except that an amount of a tackifier included in a silicone adhesive composition was 15 parts by weight.

Example 4. Manufacture of Non-Substrate Adhesive Tape with Different Adhesive Properties on Both Sides A non-substrate adhesive tape was manufactured in the same manner as in Example 1, except that an amount of a tackifier included in a silicone adhesive composition was 20 parts by weight.

Example 5. Manufacture of Non-Substrate Adhesive Tape with Different Adhesive Properties on Both Sides A non-substrate adhesive tape was manufactured in the same manner as in Example 1, except that amounts of a tackifier and a curing agent included in a silicone adhesive composition were 10 parts by weight and 4 parts by weight, respectively.

Comparative Example 1. Manufacture of Non-Substrate Adhesive Tape

A non-substrate adhesive tape was manufactured in the same manner as in Example 1, except that a primer coating layer was not formed.

Comparative Example 2. Manufacture of Non-Substrate Adhesive Tape

A non-substrate adhesive tape was manufactured in the same manner as in Example 2, except that a primer coating layer was not formed.

Comparative Example 3. Manufacture of Non-Substrate Adhesive Tape

A non-substrate adhesive tape was manufactured in the same manner as in Example 3, except that a primer coating layer was not formed.

Comparative Example 4. Manufacture of Non-Substrate Adhesive Tape

A non-substrate adhesive tape was manufactured in the same manner as in Example 4, except that a primer coating layer was not formed.

Comparative Example 5. Manufacture of Non-Substrate Adhesive Tape

A non-substrate adhesive tape was manufactured in the same manner as in Example 5, except that a primer coating layer was not formed.

Table 1 below shows the amounts of the compositions included in the silicone adhesive compositions used in Examples 1 to 5 and Comparative Examples 1 to 5 and the formation or non-formation of the primer coating layer.

TABLE 1

|  | Silicone adhesive (parts by weight) | Tackifier (parts by weight) | Curing agent (parts by weight) | Primer coating layer |
|---|---|---|---|---|
| Example 1 | 100 | 5 | 1 | Formed |
| Example 2 | 100 | 10 | 1 | Formed |
| Example 3 | 100 | 15 | 1 | Formed |
| Example 4 | 100 | 20 | 1 | Formed |
| Example 5 | 100 | 10 | 4 | Formed |
| Comparative Example 1 | 100 | 5 | 1 | Not formed |
| Comparative Example 2 | 100 | 10 | 1 | Not formed |
| Comparative Example 3 | 100 | 15 | 1 | Not formed |
| Comparative Example 4 | 100 | 20 | 1 | Not formed |
| Comparative Example 5 | 100 | 10 | 4 | Not formed |

Experimental Example 1. Adhesive Strength Test

In order to measure the adhesive strengths of the silicone adhesive layer and the acrylic adhesive layer in the non-substrate adhesive tapes manufactured in Examples 1 to 5 and Comparative Examples 1 to 5, a test sample was reciprocally compressed on SUS304 with a 2 kg roller once in accordance with ASTM D-1000, was left at room temperature for 20 minutes, and the adhesive strength was measured by using INSTRON 3343 at a delamination angle of 180° and a delamination rate of 300 mm/min. At this time, an ambient temperature was 23° C. and a humidity was 65%. The results thereof are shown in Table 2 below.

TABLE 2

|  | Adhesive strength (gf/in) | |
|---|---|---|
|  | Silicone adhesive layer | Acrylic adhesive layer |
| Example 1 | 1,100 | 2,200 |
| Example 2 | 1,500 | 2,184 |
| Example 3 | 1,300 | 2,304 |
| Example 4 | 700 | 2,270 |
| Example 5 | 1,100 | 2,330 |
| Comparative Example 1 | No measurement | No measurement |
| Comparative Example 2 | No measurement | No measurement |
| Comparative Example 3 | No measurement | No measurement |
| Comparative Example 4 | 719 | No measurement |
| Comparative Example 5 | 1,013 | No measurement |

As shown in Table 2 above, in the case of the silicone adhesive layers of the non-substrate adhesive tapes manufactured according to the examples of the present invention, it was confirmed that, as the amounts of the tackifier and the curing agent increased, the tack decreased and thus the adhesive strength decreased. However, in the case of the non-substrate adhesive tape manufactured according to the comparative examples, layer separation occurred between the silicone adhesive layer and the acrylic adhesive layer, making it impossible to measure the adhesive strengths of some silicone adhesive layers and all the acrylic adhesive layers.

Experimental Example 2. Probe Tack Measurement Test

In order to measure the tacks of the silicone adhesive layer and the acrylic adhesive layer in the non-substrate adhesive tapes manufactured in Examples 1 to 5 and Comparative Examples 1 to 5, a test sample was cut into a size of 25 mm×25 mm and attached to an annular ring with a test surface facing down, and the probe tack was measured by using Cheminstrument PT-1000. At this time, an ambient temperature was 23° C. and a humidity was 65%. The results thereof are shown in Table 3 below.

On the other hand, the tack is closely related to the wettability to the substrate. As the tack increases, the wettability to the substrate is excellent, thereby improving adhesive strength.

TABLE 3

|  | Tack (g) | |
|---|---|---|
|  | Silicone adhesive layer | Acrylic adhesive layer |
| Example 1 | 411.8 | 523.2 |
| Example 2 | 338.2 | 512.4 |
| Example 3 | 270.2 | 540.7 |
| Example 4 | 153.3 | 527.1 |
| Example 5 | 222.9 | 533.5 |
| Comparative Example 1 | 427.3 | 517.4 |
| Comparative Example 2 | 360.1 | 524.1 |
| Comparative Example 3 | 265.4 | 511.9 |
| Comparative Example 4 | 167.7 | 534.4 |
| Comparative Example 5 | 201.4 | 507.9 |

As shown in Table 3 above, for the tack using the probe tack in the non-substrate adhesive tapes manufactured according to the examples of the present invention and the comparative examples, it was confirmed that, as the amount of the tackifier increases, the surface was hardened and the tack was reduced due to an increase in the degree of crosslinking due to the curing agent.

Experimental Example 3. Holding Power Test

In order to measure the holding powers of the silicone adhesive layer and the acrylic adhesive layer in the non-substrate adhesive tapes manufactured in Examples 1 to 5 and Comparative Examples 1 to 5, a sample with a size of 25 mm×25 mm (width×length) was attached to a cleaned SUS plate, the sample was reciprocally compressed at a speed of 300 mm/min by using a 2 kg compression roller, and was left at room temperature 23° C. for 20 minutes. After the sample was placed in a holding power tester, a weight (1 kg) was hung at a test temperature of 90° C. and a pushed distance was measured after 1 hour. The results thereof are shown in Table 4 below.

TABLE 4

| | Holding power (mm) | |
| --- | --- | --- |
| | Silicone adhesive layer | Acrylic adhesive layer |
| Example 1 | 0 | 0 |
| Example 2 | 0 | 0 |
| Example 3 | 0 | 0 |
| Example 4 | 3 | 0 |
| Example 5 | 1 | 0 |
| Comparative Example 1 | No measurement | No measurement |
| Comparative Example 2 | No measurement | No measurement |
| Comparative Example 3 | No measurement | No measurement |
| Comparative Example 4 | No measurement | No measurement |
| Comparative Example 5 | No measurement | No measurement |

As shown in Table 4 above, in the case of the non-substrate adhesive tapes manufactured according to the comparative examples, layer separation occurred between the silicone adhesive layer and the acrylic adhesive layer, making it impossible to measure the holding powers of all the silicone adhesive layers and all the acrylic adhesive layers.

Experimental Example 4. Measurement of Layer Separation or Non-Separation

In order to measure the layer separation or non-separation in the non-substrate adhesive tapes manufactured in Examples 1 to 5 and Comparative Examples 1 to 5, a test sample was cut into a size of 25 mm×25 mm, and SUS was attached to both adhesive surfaces. The test sample was reciprocally compressed with a 2 kg roller once, and the prepared test sample was left in a chamber at 50° C. for 30 minutes. Then, the test sample was taken out and left at room temperature for 10 minutes. Then, both ends of the prepared test sample were placed on the UTM upper and lower jigs and pulled at a rate of 12.7 mm/min to a shear strength of 30 kgf/cm$^2$ to check whether the silicone adhesive layer and the acrylic adhesive layer laminated without a substrate were separated. The results thereof are shown in Table 5 below.

TABLE 5

| | Layer separation |
| --- | --- |
| Example 1 | Not separated |
| Example 2 | Not separated |
| Example 3 | Not separated |
| Example 4 | Not separated |
| Example 5 | Not separated |
| Comparative Example 1 | Separated |
| Comparative Example 2 | Separated |
| Comparative Example 3 | Separated |
| Comparative Example 4 | Separated |
| Comparative Example 5 | Separated |

As shown in Table 5, in the case of the non-substrate adhesive tapes manufactured according to the examples of the present invention, it was confirmed that layer separation did not occur between the silicone adhesive layer and the acrylic adhesive layer because the primer coating layer was included.

However, in the case of the non-substrate adhesive tapes manufactured according to the comparative examples, it was confirmed that, since the primer coating layer was not included, the adhesive strength between the silicone adhesive layer and the acrylic adhesive layer was low, so that layer separation occurred. Through this, it was confirmed that the non-substrate adhesive tapes manufactured according to the comparative examples were not suitable for use in the actual industrial field.

Since the non-substrate adhesive tape according to the present invention is manufactured without a substrate, that is, in a non-substrate state, the non-substrate adhesive tape may have very excellent characteristics with respect to bending and shape deformation because the non-substrate adhesive tape is soft and has excellent adhesion to the bonding surface and repulsion resistance to the bent portion. Therefore, the non-substrate adhesive tape may be usable in various fields such as an optically clear adhesive (OCA) film in mobile devices.

In addition, since the primer coating layer is interposed between the heterogeneous first and second adhesive layers with different properties, layer separation does not occur between the first adhesive layer and the second adhesive layer, which may be very stable. In addition, since it is possible to implement the adhesive tape with different adhesive properties on both sides, various materials from materials with low surface energy to materials with high surface energy may be widely applied, and various adhesive strengths from low to strong may be realized.

The present invention has been described in detail with reference to the preferred embodiments and the drawings, but the scope of the technical idea of the present invention is not limited to these drawings and embodiments. Accordingly, various modifications or equivalents thereof may fall within the scope of the technical idea of the present invention. Therefore, the scope of the technical idea according to the present invention should be interpreted by the claims, and the technical idea within the equivalents should be interpreted as falling within the scope of the present invention.

What is claimed is:

1. A non-substrate adhesive tape with different adhesive properties on both sides, the non-substrate adhesive tape comprising:
    a first adhesive layer;
    a second adhesive layer; and
    a primer coating layer interposed between the first adhesive layer and the second adhesive layer,
    wherein the first adhesive layer is a silicone adhesive layer,
    an adhesive strength of the silicone adhesive layer relative to an adherend is 700 gf/in to 2,000 gf/in, wherein the adherend is not the second adhesive layer, and
    a thickness of the primer coating layer is 0.1 μm to 50 μm.

2. The non-substrate adhesive tape of claim 1, wherein the silicone adhesive layer includes a material selected from the group consisting of a silicone gum, a silicone resin, and any combination thereof.

3. The non-substrate adhesive tape of claim 2, wherein the silicone gum includes a material selected from the group consisting of organopolysiloxane having at least one functional group selected from a phenyl group, an amino group, a hydroxy group, a mercapto group, and a carboxyl group, polysiloxane having a vinyl group, methyl polysiloxane having a vinyl group, polydimethylsiloxane having a vinyl group, and any combination thereof.

4. The non-substrate adhesive tape of claim 2, wherein the silicone adhesive layer further includes a material selected from the group consisting of a tackifier, an anchorage, and any combination thereof.

5. The non-substrate adhesive tape of claim 1, wherein a thickness of the silicone adhesive layer is 1 μm to 1,000 μm.

6. The non-substrate adhesive tape of claim 1, wherein the second adhesive layer includes an adhesive selected from the group consisting of an acrylic adhesive, a urethane-based adhesive, a rubber-based adhesive, an epoxy-based adhesive, and any combination thereof.

7. The non-substrate adhesive tape of claim 6, wherein the acrylic adhesive is an acrylic copolymer containing methacrylic acid alkylester having 2 to 18 carbon atoms.

8. The non-substrate adhesive tape of claim 1, wherein a thickness of the second adhesive layer is 1 μm to 1,000 μm.

9. The non-substrate adhesive tape of claim 1, wherein an adhesive strength of the second adhesive layer is 10 gf/in to 5,000 gf/in.

10. The non-substrate adhesive tape of claim 1, wherein the primer coating layer is formed by performing physical surface treatment or chemical bonding on the silicone adhesive layer.

11. The non-substrate adhesive tape of claim 10, wherein the physical surface treatment is performed by using corona or carbon dioxide ($CO_2$) plasma treatment on the silicon adhesive layer.

12. The non-substrate adhesive tape of claim 10, wherein the chemical bonding is performed by coating a material selected from the group consisting of an acrylic resin having a carboxyl group and a hydroxyl group, a urethane-based resin, an epoxy-based resin, a silicone-based resin, a rubber-based resin, a silicone modified resin, and any combination thereof on the silicone adhesive layer.

13. The non-substrate adhesive tape of claim 1, wherein the adherend is stainless steel.

14. A method of manufacturing the non-substrate adhesive tape with different adhesive properties on both sides according to claim 1, the method comprising:
  applying and curing the first adhesive layer onto a first release film;
  applying and curing the primer coating layer onto the first adhesive layer;
  applying and curing the second adhesive layer onto a second release film; and
  laminating the primer coating layer and the second adhesive layer,
  wherein the first adhesive layer is a silicone adhesive layer.

15. A non-substrate adhesive tape with different adhesive properties on both sides, the non-substrate adhesive tape comprising:
  a first adhesive layer;
  a second adhesive layer; and
  a primer coating layer interposed between the first adhesive layer and the second adhesive layer,
  wherein the first adhesive layer is a silicone adhesive layer,
  an adhesive strength of the silicone adhesive layer relative to an adherend is 700 gf/in to 2,000 gf/in,
  a thickness of the primer coating layer is 25 μm to 50 μm,
  the primer coating layer is formed by performing physical surface treatment or chemical bonding on the silicone adhesive layer, and
  the chemical bonding is performed by coating a material selected from the group consisting of an acrylic resin having a carboxyl group and a hydroxyl group, a urethane-based resin, an epoxy-based resin, a silicone-based resin, a rubber-based resin, a silicone modified resin, and any combination thereof on the silicone adhesive layer.

16. A non-substrate adhesive tape with different adhesive properties on both sides, the non-substrate adhesive tape comprising:
  a first adhesive layer;
  a second adhesive layer; and
  a primer coating layer interposed between the first adhesive layer and the second adhesive layer,
  wherein the first adhesive layer is a silicone adhesive layer,
  an adhesive strength of the silicone adhesive layer relative to an adherend is 700 gf/in to 2,000 gf/in,
  the second adhesive layer includes an acrylic adhesive and an additional adhesive selected from the group consisting of a urethane-based adhesive, a rubber-based adhesive, and any combination thereof,
  a thickness of the primer coating layer is 0.1 μm to 50 μm,
  the primer coating layer is formed by performing physical surface treatment or chemical bonding on the silicone adhesive layer, and
  the chemical bonding is performed by coating a material selected from the group consisting of an acrylic resin having a carboxyl group and a hydroxyl group, a urethane-based resin, an epoxy-based resin, a silicone-based resin, a rubber-based resin, a silicone modified resin, and any combination thereof on the silicone adhesive layer.

* * * * *